US007051111B1

(12) United States Patent
Scullin (10) Patent No.: US 7,051,111 B1
(45) Date of Patent: May 23, 2006

(54) MULTIPLE SOURCE PROXY MANAGEMENT SYSTEM

(75) Inventor: Will Scullin, San Francisco, CA (US)

(73) Assignee: Digeo, Inc., Kirkland, WA (US)

( * ) Notice: Subject to any disclaimer, the term of this patent is extended or adjusted under 35 U.S.C. 154(b) by 0 days.

(21) Appl. No.: 09/558,077

(22) Filed: Apr. 25, 2000

(51) Int. Cl.
G06F 15/16 (2006.01)

(52) U.S. Cl. ............... 709/232; 709/202; 709/229; 725/32; 725/63; 345/778

(58) Field of Classification Search ............ 709/202, 709/229, 232; 725/32, 63; 345/778
See application file for complete search history.

(56) References Cited

U.S. PATENT DOCUMENTS

| 4,944,008 | A | * | 7/1990 | Piosenka et al. |
| 4,958,230 | A | | 9/1990 | Jonnalagadda et al. |
| 5,029,003 | A | | 7/1991 | Jonnalagadda |
| 5,146,325 | A | | 9/1992 | Ng |
| 5,184,218 | A | | 2/1993 | Gerdes |

(Continued)

FOREIGN PATENT DOCUMENTS

| EP | 0 346 700 A2 | 12/1989 |
| EP | 0 364 229 A2 | 4/1990 |
| EP | 0 512 398 A2 | 11/1992 |
| EP | 0 666 694 A1 | 8/1995 |
| EP | 0 676 761 A1 | 10/1995 |
| EP | 0 693 727 A1 | 1/1996 |

(Continued)

OTHER PUBLICATIONS

MediaStream MRX-2 PC-DVB Satellite Receiver Card Brochure, Media4, Inc., Aug. 1998, 2 pages.
MediaStream MRX-3-PC-DVB Satellite Receiver Card Brochure, Media4, Inc., Aug. 1998, 2 pages.
MediaStream IP-DVB Gateway Brochure, Media4, Inc., May 1998, 2 pages.
MediaStream Network Control System Brochure, Media4, Inc., May 1998, 2 pages.
MediaStream Broadcast Server Brochure, Media4, Inc., May 1998, 2 pages.
MediaStorm II Brochure, Jul. 5, 1999, 2 pages from NDS.
Business at the speed of thought Brochure, Oct. 9, 1998, 11 pages, Cyberstar, A Loral Company.
Broadband Technology Choices Brochure, Mar. 24, 1998, 7 pages, Cyberstar, A Loral Company.
Why Satellite-based high-speed communications sense, Mar. 24, 1998, 4 pages, Cyberstar, A Loral Company.

*Primary Examiner*—Saleh Najjar
*Assistant Examiner*—Liang-che Wang
(74) *Attorney, Agent, or Firm*—Kory D. Christensen; Stoel Rives LLP (57) ABSTRACT

A multiple source proxy management system is disclosed. Most Internet browsers communicate only with the global Internet. However, new data services may be created that can provide information to an Internet browser in a compatible form. Since Internet browsers only know how to communicate with the Internet, a new system was developed to handle communication with other data services. The system includes a personal proxy server that handles requests from the Internet browser. The personal proxy server directs requests to a proper data server handler. The personal proxy server respects all existing Internet settings such as direct connections, proxy servers, and autoconfig proxy servers.

14 Claims, 8 Drawing Sheets

U.S. PATENT DOCUMENTS

| | | |
|---|---|---|
| 5,200,715 A | 4/1993 | Gerdes et al. |
| 5,230,019 A | 7/1993 | Yanagimichi et al. |
| 5,247,575 A | 9/1993 | Sprague et al. |
| 5,327,237 A | 7/1994 | Gerdes et al. |
| 5,351,293 A | 9/1994 | Michener et al. |
| 5,371,551 A * | 12/1994 | Logan et al. |
| 5,387,941 A | 2/1995 | Montgomery et al. |
| 5,410,360 A | 4/1995 | Montgomery |
| 5,437,714 A | 8/1995 | Engel et al. |
| 5,444,491 A | 8/1995 | Lim |
| 5,495,246 A * | 2/1996 | Nichols et al. |
| 5,515,373 A * | 5/1996 | Lynch et al. |
| 5,550,576 A | 8/1996 | Klosterman |
| 5,557,333 A | 9/1996 | Jungo et al. |
| 5,559,559 A | 9/1996 | Jungo et al. |
| 5,572,247 A | 11/1996 | Montgomery et al. |
| 5,574,964 A | 11/1996 | Hamlin |
| 5,577,042 A | 11/1996 | McGraw et al. |
| 5,584,023 A * | 12/1996 | Hsu |
| 5,585,858 A | 12/1996 | Harper et al. |
| 5,615,264 A | 3/1997 | Kazmierczak et al. |
| 5,615,338 A | 3/1997 | Poole et al. |
| 5,617,148 A | 4/1997 | Montgomery |
| 5,617,565 A | 4/1997 | Augenbraun et al. |
| 5,631,651 A * | 5/1997 | Nichols et al. |
| 5,632,007 A | 5/1997 | Freeman |
| 5,634,074 A * | 5/1997 | Devon et al. |
| 5,636,211 A | 6/1997 | Newlin et al. |
| 5,650,831 A | 7/1997 | Farwell |
| 5,671,283 A | 9/1997 | Michener et al. |
| 5,671,377 A | 9/1997 | Bleidt et al. |
| 5,684,525 A | 11/1997 | Klosterman |
| 5,691,986 A | 11/1997 | Pearlstein |
| 5,701,580 A | 12/1997 | Yamane et al. |
| 5,708,476 A | 1/1998 | Myhrvold et al. |
| 5,708,960 A | 1/1998 | Kamisaka et al. |
| 5,721,727 A | 2/1998 | Ashi et al. |
| 5,721,827 A * | 2/1998 | Logan et al. |
| 5,724,091 A | 3/1998 | Freeman et al. |
| 5,727,233 A * | 3/1998 | Lynch et al. |
| 5,731,841 A | 3/1998 | Rosenbaum et al. |
| 5,732,216 A * | 3/1998 | Logan et al. |
| 5,734,589 A | 3/1998 | Kostreski et al. |
| 5,734,862 A * | 3/1998 | Kulas |
| 5,737,107 A | 4/1998 | Umeda |
| 5,739,866 A | 4/1998 | Kim et al. |
| 5,742,357 A | 4/1998 | Griesbaum |
| 5,745,185 A | 4/1998 | Portron et al. |
| 5,748,789 A | 5/1998 | Lee et al. |
| 5,758,258 A | 5/1998 | Shoff et al. |
| 5,761,606 A | 6/1998 | Wolzien |
| 5,764,762 A | 6/1998 | Kazmierczak et al. |
| 5,774,172 A | 6/1998 | Kapell et al. |
| 5,774,664 A | 6/1998 | Hidary et al. |
| 5,778,181 A | 7/1998 | Hidary et al. |
| 5,778,187 A | 7/1998 | Monteiro et al. |
| 5,781,228 A | 7/1998 | Sposato |
| 5,790,198 A | 8/1998 | Roop et al. |
| 5,793,413 A | 8/1998 | Hylton et al. |
| 5,797,001 A | 8/1998 | Augenbraun et al. |
| 5,799,190 A * | 8/1998 | Lynch et al. |
| 5,805,763 A | 9/1998 | Lawler et al. |
| 5,815,145 A | 9/1998 | Matthews, III |
| 5,815,195 A | 9/1998 | Tam |
| 5,819,298 A * | 10/1998 | Wong et al. |
| 5,825,927 A | 10/1998 | Boyce et al. |
| 5,828,839 A | 10/1998 | Moncreiff |
| 5,828,945 A | 10/1998 | Klosterman |
| 5,831,679 A | 11/1998 | Montgomery et al. |
| 5,838,873 A | 11/1998 | Blatter et al. |
| 5,857,185 A | 1/1999 | Augenbraun et al. |
| 5,861,881 A | 1/1999 | Freeman et al. |
| 5,861,906 A | 1/1999 | Dunn et al. |
| 5,862,220 A * | 1/1999 | Perlman |
| 5,867,657 A | 2/1999 | Bolosky et al. |
| 5,870,477 A * | 2/1999 | Sasaki et al. |
| 5,874,985 A | 2/1999 | Matthews, III |
| 5,883,869 A | 3/1999 | Tamai et al. |
| 5,892,536 A * | 4/1999 | Logan et al. |
| 5,896,414 A | 4/1999 | Meyer et al. |
| 5,896,444 A * | 4/1999 | Perlman et al. |
| 5,900,905 A | 5/1999 | Shoff et al. |
| 5,903,563 A | 5/1999 | Rashid et al. |
| 5,903,673 A | 5/1999 | Wang et al. |
| 5,903,816 A | 5/1999 | Braodwin et al. |
| 5,907,323 A | 5/1999 | Lawler et al. |
| 5,913,038 A | 6/1999 | Griffiths |
| 5,918,002 A | 6/1999 | Klemets et al. |
| 5,918,013 A * | 6/1999 | Mighdoll et al. |
| 5,923,328 A | 7/1999 | Griesmer |
| 5,923,362 A | 7/1999 | Klosterman |
| 5,926,624 A | 7/1999 | Katz et al. |
| 5,929,850 A | 7/1999 | Broadwin et al. |
| 5,931,949 A * | 8/1999 | Perlman et al. |
| 5,938,748 A * | 8/1999 | Lynch et al. |
| 5,940,073 A | 8/1999 | Klosterman |
| 5,945,987 A | 8/1999 | Dunn |
| 5,953,012 A | 9/1999 | Veghte et al. |
| 5,959,508 A | 9/1999 | Aitken |
| 5,963,909 A | 10/1999 | Warren et al. |
| 5,966,637 A | 10/1999 | Kanungo et al. |
| 5,974,496 A | 10/1999 | Miller |
| 5,978,381 A * | 11/1999 | Perlman et al. |
| 5,983,005 A | 11/1999 | Monteiro et al. |
| 5,983,273 A * | 11/1999 | White et al. |
| 5,986,692 A * | 11/1999 | Logan et al. |
| 5,987,518 A | 11/1999 | Gotwald |
| 6,005,938 A | 12/1999 | Banker et al. |
| 6,006,256 A | 12/1999 | Zdepski et al. |
| 6,014,693 A | 1/2000 | Ito et al. |
| 6,014,694 A | 1/2000 | Aharoni et al. |
| 6,021,419 A | 2/2000 | Clarke, Jr. et al. |
| 6,023,585 A * | 2/2000 | Perlman et al. |
| 6,026,079 A * | 2/2000 | Perlman |
| 6,044,396 A | 3/2000 | Adams |
| 6,049,694 A | 4/2000 | Kassatly |
| 6,064,796 A | 5/2000 | Nakamura et al. |
| 6,226,241 B1 | 5/2000 | D'Amato et al. |
| 6,072,872 A | 6/2000 | Chang et al. |
| 6,073,168 A * | 6/2000 | Mighdoll et al. |
| 6,084,583 A | 7/2000 | Gerszberg et al. |
| 6,088,455 A * | 7/2000 | Logan et al. |
| RE36,801 E | 8/2000 | Logan et al. |
| 6,108,422 A | 8/2000 | Newby et al. |
| 6,118,498 A | 9/2000 | Reitmeir |
| 6,134,590 A * | 10/2000 | Perlman |
| 6,138,147 A | 10/2000 | Weaver et al. |
| 6,141,356 A | 10/2000 | Gorman |
| 6,141,693 A * | 10/2000 | Perlman et al. |
| 6,169,879 B1 * | 1/2001 | Perlman |
| 6,188,397 B1 | 2/2001 | Humpleman |
| 6,199,076 B1 | 3/2001 | Logan et al. |
| 6,199,114 B1 | 3/2001 | White et al. |
| 6,230,168 B1 * | 5/2001 | Unger et al. ............. 715/501.1 |
| 6,233,389 B1 | 5/2001 | Barton et al. |
| 6,286,031 B1 * | 9/2001 | Waese et al. ............. 709/203 |
| 6,345,303 B1 * | 2/2002 | Knauerhase et al. ........ 709/238 |
| 6,349,410 B1 * | 2/2002 | Lortz ..................... 725/110 |
| 6,360,368 B1 | 3/2002 | Chawla |
| 6,366,699 B1 * | 4/2002 | Kuwano et al. ........... 382/199 |
| 6,366,731 B1 | 4/2002 | Na et al. |

| | | | | | | |
|---|---|---|---|---|---|---|
| 6,374,402 | B1 | 4/2002 | Schmeidler et al. | EP | 0 749 244 A2 | 12/1996 |
| 6,408,128 | B1 | 6/2002 | Abecassis | EP | 0 753 964 A1 | 1/1997 |
| 6,412,008 | B1 * | 6/2002 | Fields et al. ............ 709/228 | EP | 0 756 393 A1 | 1/1997 |
| 6,505,299 | B1 | 1/2003 | Zeng et al. | EP | 0 773 681 A2 | 5/1997 |
| 6,519,771 | B1 * | 2/2003 | Zenith ..................... 725/32 | EP | 0 903 738 A2 | 3/1999 |
| 6,526,580 | B1 * | 2/2003 | Shimomura et al. ........ 725/63 | EP | 0 911 962 A1 | 4/1999 |
| 6,532,495 | B1 * | 3/2003 | Welles et al. ............ 709/232 | EP | 0 971 358 A2 | 1/2000 |
| 6,557,756 | B1 * | 5/2003 | Smith ..................... 235/379 | EP | 1 018 835 A2 | 7/2000 |
| 6,559,882 | B1 * | 5/2003 | Kerchner ................. 348/61 | EP | 1 032 195 A2 | 8/2000 |
| 6,578,070 | B1 | 6/2003 | Weaver et al. | EP | 1 056 279 A1 | 11/2000 |
| 6,603,488 | B1 | 8/2003 | Humpleman et al. | EP | 01 079 581 A2 | 2/2001 |
| 6,611,503 | B1 | 8/2003 | Fitzgerald et al. | EP | 1 143 722 A2 | 10/2001 |
| 6,614,843 | B1 | 9/2003 | Gordon et al. | GB | 2 333 017 A | 7/1999 |
| 6,665,687 | B1 * | 12/2003 | Burke ..................... 707/104.1 | WO | WO 99/33265 | 7/1991 |
| 6,675,387 | B1 | 1/2004 | Boucher et al. | WO | WO 99/22513 A2 | 5/1999 |
| 6,686,936 | B1 * | 2/2004 | Nason et al. ............. 345/778 | WO | WO 00/01149 A1 | 1/2000 |
| 6,886,013 | B1 * | 4/2005 | Beranek ................... 707/10 | WO | WO 00/51129 | 8/2000 |
| 2001/0003823 | A1 * | 6/2001 | Mighdoll et al. .......... 709/200 | WO | WO 01/04893 A1 | 1/2001 |
| 2002/0120790 | A1 * | 8/2002 | Schwalb ................... 709/328 | WO | WO 01/11865 A2 | 2/2001 |
| | | | | WO | WO 01/37546 A6 | 5/2001 |
| | | FOREIGN PATENT DOCUMENTS | | WO | WO 01/74079 A1 | 10/2001 |
| EP | | 0 714 204 A2 | 5/1996 | * cited by examiner | | |

MULTIPLE SOURCE PROXY MANAGEMENT SYSTEM

RELATED APPLICATIONS

This patent application is related to a patent application entitled "A Broadband Data Broadcasting Service", filed on Apr. 16, 1999, having Ser. No. 09/293,594.

FIELD OF THE INVENTION

The present invention relates to the field of proxy management. In particular the present invention discloses a proxy system that allows multiple sources of data to be accessed.

BACKGROUND OF THE INVENTION

The Internet has become a major source of news and information for very large numbers of people. In particular, millions of Internet users browse the World Wide Web (WWW) to obtain HyperText Markup Language (HTML) documents using the HyperText Transport Protocol (HTTP). Many people now receive more news and information from the Internet WWW sites than from traditional information sources such as television. The WWW portion of the Internet is an excellent medium for news and information since the WWW Internet sites can provide information to users on-demand. Specifically, Internet users can immediately request the exact information they are interested in when ever they wish from WWW Internet sites.

However, the use of the Internet WWW as a news distribution does suffer from a number of deficiencies. One serious problem is that the limited bandwidth of most Internet connections severely limits the amount of information delivered. Most Internet users access the Internet through a telephone-based dial-up modem at speeds of 56 kps per second or less. With such limited bandwidth available, most Internet based WWW sites only deliver text and static images. When video information delivered through 56K Internet connections, the video information is compressed so heavily such that only small low-resolution video images are delivered at a low frame rate. For users that are more familiar to broadcast quality television video, highly compressed Internet distributed video is not worth viewing unless the content is extremely desirable.

To improve upon the performance of the Internet, many telecommunication providers are now offering high-bandwidth connections for the "last mile" to an Internet user's residence. Cable television providers are now offering cable modem Internet service that use cable television wiring to deliver broadband Internet service. Similarly, telephone companies are rolling out Digital Subscriber Line (DSL) services that provide broadband Internet service. Although these broadband data connections provide additional bandwidth, such broadband connections only address the "last mile" bandwidth problem associated with sending rich multi-media information across the Internet. Many other problems will continue to exist. For example, the point-to-point nature of Internet communication limits large-scale video deliver. Most Internet communication occurs in a unicast manner wherein a unique communication connection is established between each information server and each Internet client. Since each Internet client requires its own connection, the bandwidth requirement for serving information grows linearly with the number of Internet clients being served. Furthermore, each Internet client that requests service adds additional load to the server systems that service information. To serve rich multimedia information to a large number of client systems, a large powerful server farm is required. It is therefore quite expensive from the server end in both communication costs and computer costs to serve large amounts of rich multi-media information.

Due to the above-described problems associated with Internet delivery of multimedia information, additional data deliver systems are being developed. An example of another data delivery system can be found in the patent application entitled "A Broadband Data Broadcasting Service", filed on Apr. 16, 1999, having Ser. No. 09/293,594. Although such systems provide highly desirable features, the Internet will still remain an interesting medium. It would therefore be desirable to provide a multi-media rich information system that is similar to the Internet in terms of on-demand access of interesting information but without the bandwidth problems associated with the Internet network system.

SUMMARY OF THE INVENTION

The present invention discloses a proxy management system that allows a browser program to access multiple different data services using a personal proxy server. The personal proxy server accesses the browser program's Internet settings to determine the current environment. The personal proxy server stores those settings so that they may be restored at a later time. The personal proxy server then changes the browser program's Internet settings such that the browser program directs future requests to the personal proxy program. The personal proxy program then accepts requests from the browser program. When the personal proxy program receives a request, the personal proxy program examines the request and selects an appropriate handler. The personal proxy program then directs the request to the appropriate handler. The appropriate handlers may include the originally specified Internet settings, a local cache program, a data appliance peripheral, or any other data service.

Other objects, features, and advantages of present invention will be apparent from the company drawings and from the following detailed description.

BRIEF DESCRIPTION OF THE DRAWINGS

The objects, features, and advantages of the present invention will be apparent to one skilled in the art, in view of the following detailed description in which.

DETAILED DESCRIPTION OF THE PREFERRED EMBODIMENT

A proxy management system is disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with reference to a wireless datacasting service that is cached on a local device. However, the same proxying techniques can easily be applied to other types of data communication systems.

Overview Internet Proxy Systems

Figure 1A:
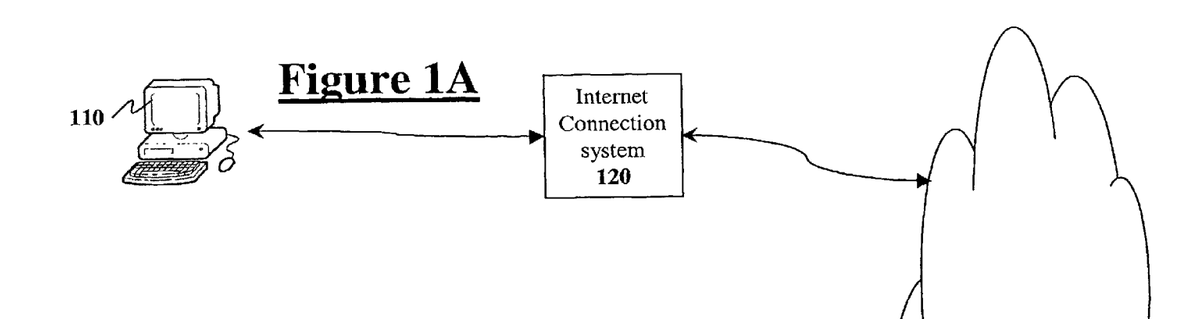
FIG. 1A illustrates a computer system coupled directly to the Internet.
Figure 1B:
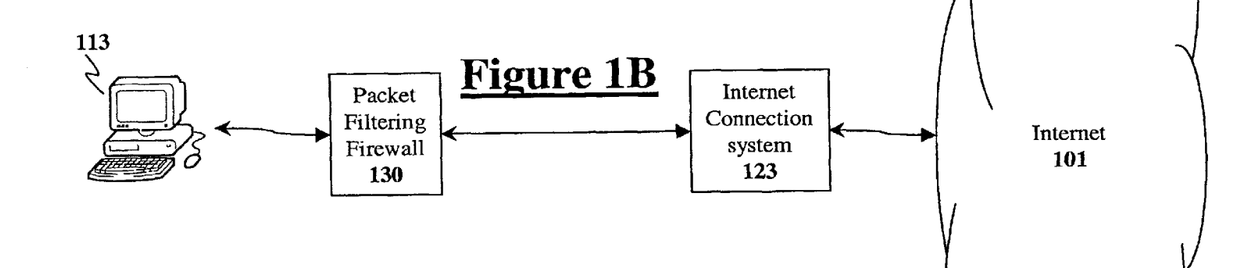
FIG. 1B illustrates a computer system coupled to the Internet through a packet filtering firewall.
Figure 1C:
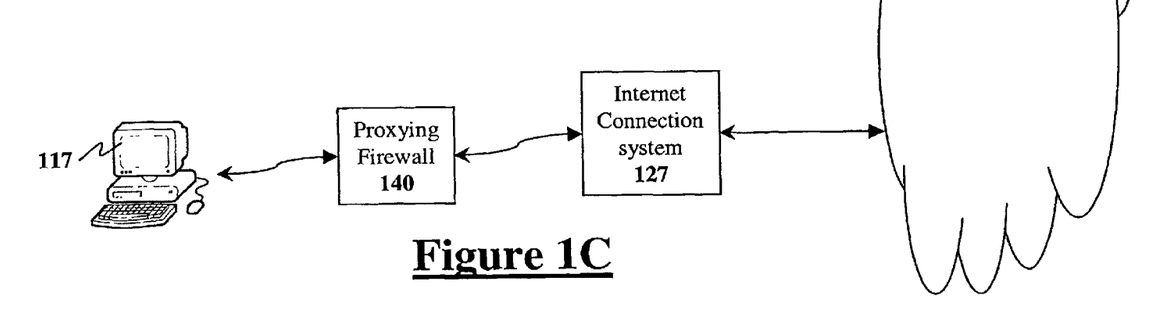
FIG. 1C illustrates a computer system indirectly coupled to the Internet through a proxying firewall.

There are a number of different ways of connecting a personal computer system to the global Internet. Each different method has its own advantages and disadvantages.
Direct Internet Connections FIG. 1A illustrates a conceptual diagram of a personal computer system 110 that has a "direct" connection to the global Internet 101. The connection is made using some type of Internet connection system 120. Most residential personal computers currently use a dial-up modem that connects to a remote access device at an Internet Service Provider (ISP) as an Internet connection system 120. In a quest for a faster Internet connection, many residential customer are now beginning to use "broadband" Internet connection systems that provide faster data throughout with lower latency. Examples of broadband Internet connection systems 120 include Digital Subscriber Line (DSL) and cable modem connections to an ISP. In a direct Internet connection, the end personal computer system in 110 uses a "legal" external Internet Protocol (IP) address that is routable. While the personal computer system is coupled to the Internet, the personal computer system 110 "owns" that unique IP address.
Indirect Internet Connections To protect computers from Internet attacks and conserve address space, many personal computer systems are coupled to the Internet using some type of indirect Internet connection. FIGS. 1B and 1C illustrate two different examples of indirect Internet connections.

In the indirect Internet connection embodiment of FIG. 1B, a packet filtering firewall 130 shields a personal computer 113 from the Internet. In such an embodiment, it is the packet filtering firewall 130 that is coupled to the Internet 101 through some type of Internet connection system 123 such as a dial-up modem, a DSL modem, a leased line, or other Internet connection. The packet filtering firewall 130 filters all the packets passing between the personal computer 113 and the Internet 101. If the packet filtering firewall 130 deems that a particular packet may be malicious, then the packet filtering firewall 130 will drop that packet. Thus, the personal computer system does communicate with entities on the global Internet, but only under the strict supervision of the packet filtering firewall 130. A packet filtering firewall 130 may also perform network address translation. Network transaction allows a firewall device to share one (or more) legal IP addresses among a number of systems on an internal network that uses non-routable IP addresses such as Net 10 addresses. (Net 10 addresses are IP addresses in the form of 10.0.0.1 to 10.255.255.255 since that address range has been designated as non-routable.)

In the indirect Internet connection embodiment of FIG. 1C, a proxying firewall 140 shields a personal computer 117 from the Internet 101. In such a proxying embodiment, only the proxying server 140 is coupled to the Internet 101 through some type of Internet connection system 127. In a proxying type of indirect Internet connection, the personal computer system 117 does not communicate directly with any entity on the Internet 101. Instead, the personal computer system 117 only communicates with the proxying firewall 140. The proxying firewall 140 examines requests for Internet content and may decide to drop requests, fulfill requests using locally cached information, relay the requests to the addressed entity on the Internet, or handle the request in another manner.

Overview of a Data Broadcast System

The present invention integrates the various direct and indirect Internet communication. systems of FIGS. 1A, 1B, and 1C with another data service. In one disclosed embodiment, a wireless data broadcast system is integrated with the Internet. However, the teachings of the present invention may be used with other types of data services.

Figures 2A, 2B:
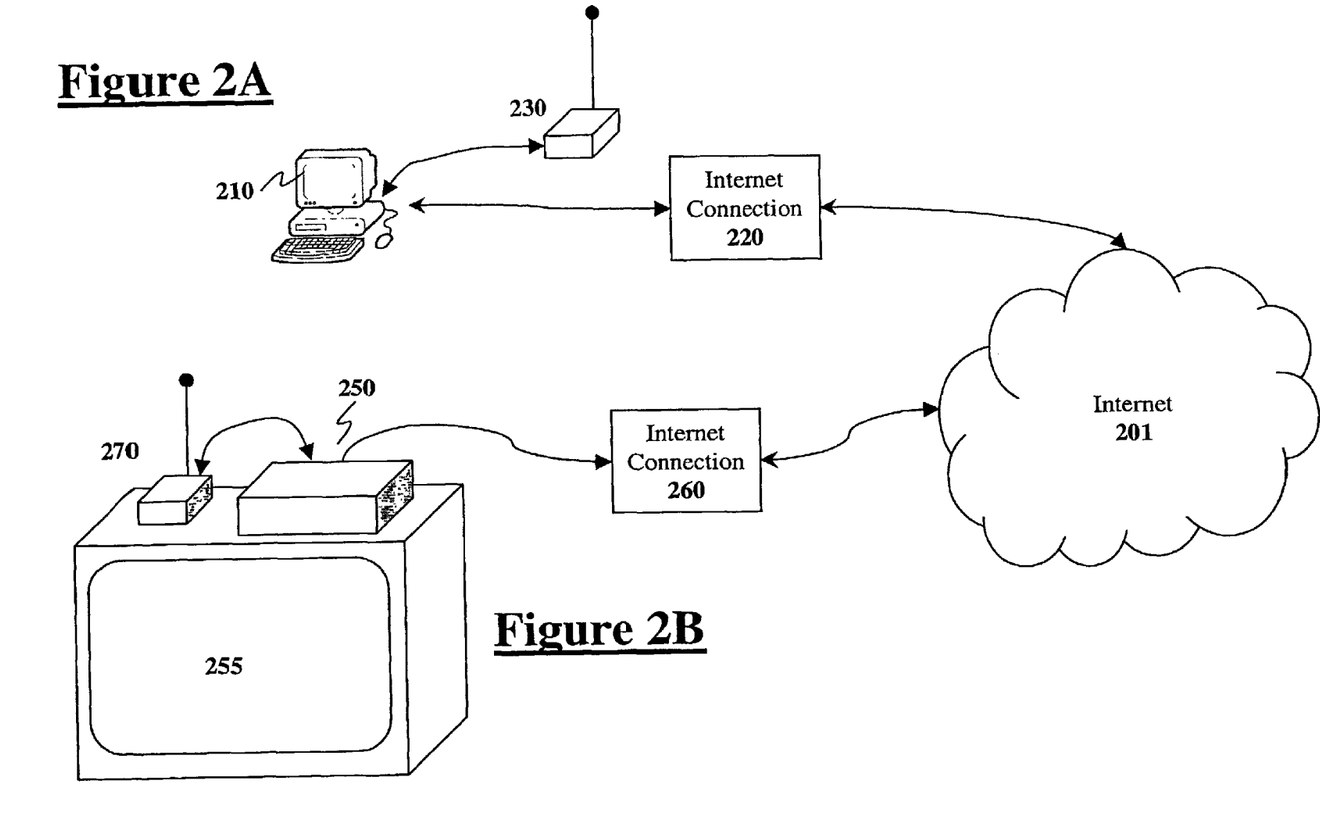
FIG. 2A illustrates a computer system coupled to a broadcast data service and the global Internet.
FIG. 2B illustrates a set-top box system coupled to a broadcast data service and the global Internet.

FIG. 2A illustrates a first example usage of a wireless data service used by a personal computer system 210. In FIG. 2A, a wireless multimedia receiver/server device 230 receives data broadcasts received through some data broadcast channel. The data broadcast channel may comprise terrestrial radio broadcasts, satellite broadcasts, cable broadcasts (such as cable TV), or any other broadcast media. In the embodiment of FIG. 2A, a personal computer system 210 is coupled directly to the wireless multimedia receiver/server device 230 to receive data from that device. A number of different interface systems such as an Ethernet interface, a FireWire™ Bus (IEEE.1394), or a Universal Serial Bus (USB) interface may couple computer system 210 to wireless multimedia receiver/server device 230. The personal computer system 210 may also be connected to the global Internet 201 through some type of Internet connection 220 to receive Internet based information.

Figure 3:
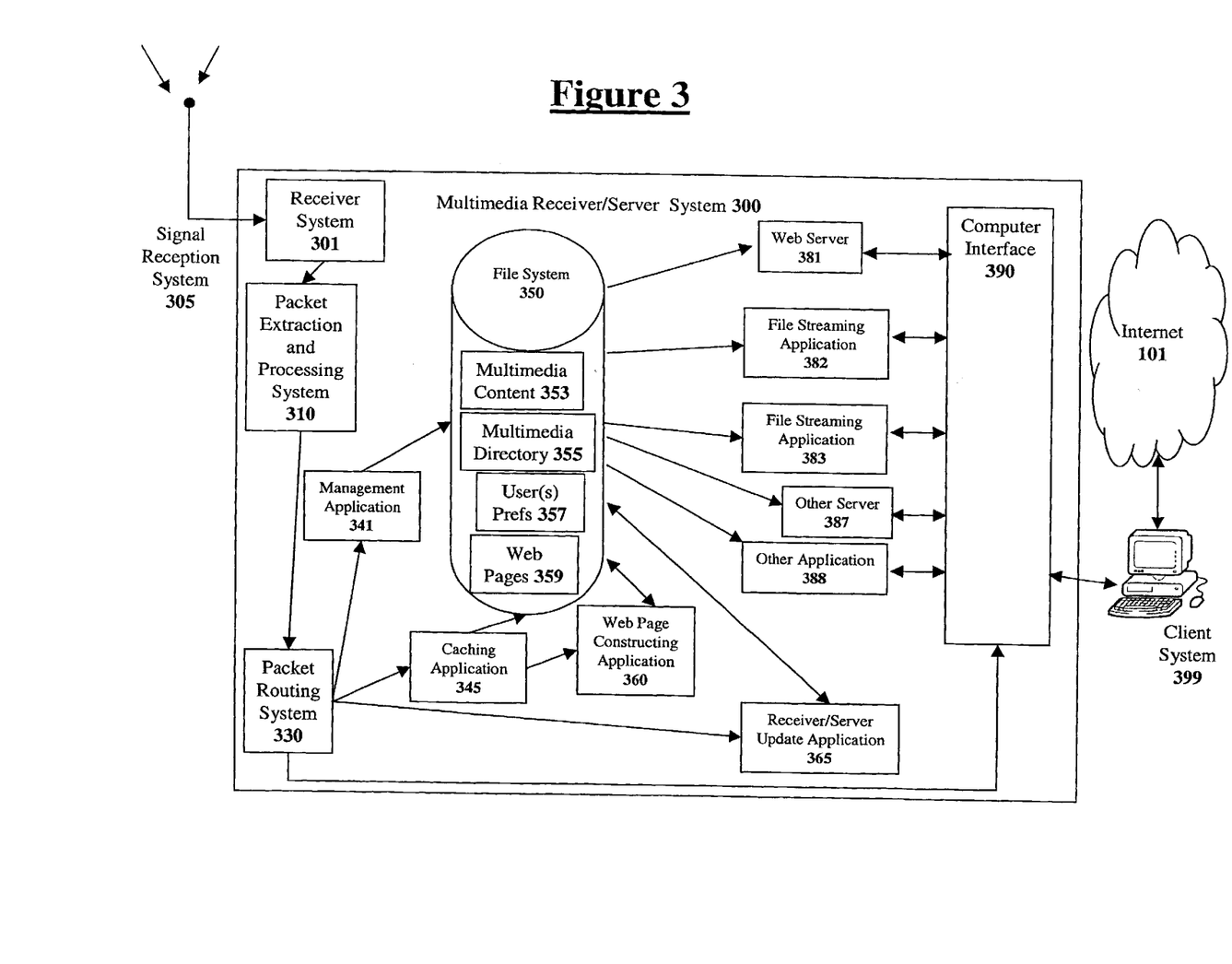
FIG. 3 illustrates a conceptual document of one possible embodiment of a data broadcast receiver system.

The wireless multimedia receiver/server device is not limited to usage by personal computer systems. FIG. 2B illustrates an example usage wherein a television set-top box 270 is coupled to a wireless multimedia receiver/server device 250. The television set-top box 270 may also be connected to the global Internet 201 through some type of Internet connection 260 to receive Internet based information.
A Data Broadcast Receiver System FIG. 3 illustrates a conceptual diagram of one possible embodiment of a data broadcast receiver system 300. Referring to the conceptual diagram of FIG. 3, a packet extraction and processing system 310 examines a multiplexed digital information stream received using the receiver system 301. The packet extraction and processing system 310 extracts network packets that may be of interest to the data broadcast receiver/server system 300. Specifically, the packet processing system 310 identifies and extracts packets that are specifically addressed to the data broadcast receiver/server system 300 and packets that have specific defined characteristics.

The extracted packets are passed to a packet routing system 330. The packet routing system 330 routes the received packets appropriate destinations. The packet routing system 330 may route other data packets to client system 399 coupled to the multimedia receiver/server system 300 through computer interface 390. In such operations, the multimedia receiver/server system 300 acts as a packet router to deliver packets broadcast over a broadcast medium.

The data broadcast receiver/server system 300 may also be used to provide useful data services by locally caching information. Specifically, one or more caching applications 345 receive data packets from the packet routing system 330 and caches information from those packets into a file system 350. In one embodiment, the caching application 345 may request to receive packets addressed to one or more designated addresses that carry multimedia information and accompanying descriptors. The caching application 345 selectively captures multimedia information and stores that multimedia content information 353 in a file system 350. The caching application 345 may create multimedia information directory 355 such that the cached multimedia information may be quickly searched and accessed. The multimedia information may consist of anything that can be expressed in digital form including audio, video, text, web pages, and computer programs.

The data broadcast receiver/server system 300 may present the cached multimedia information in a number of different ways. However, one of the most popular current methods of presenting information is in the form of World Wide Web (WWW) pages formatted in HyperText Markup Language (HTML) or eXtensible Markup Language (XML). One embodiment of the data broadcast receiver/server system 300 uses a web page constructing application 360 to create WWW pages 359 that may be presented to the client system 399. A web server application 381 serves the created web pages 359 to client systems that request the web pages 359. Due to the caching of rich multimedia information, the web server 3781 may be aided by one or more file streaming applications 382 and 383. The file streaming applications 382 and 383 may stream rich multimedia information such as videos and audio.

The data broadcast receiver/server system 300 of FIG. 3 is only meant to provide one possible embodiment of a data broadcast system. Additional information on a data broadcast system can be found in the U.S. patent application entitled "A Broadband Data Broadcasting Service", filed on Apr. 16, 1999, having Ser. No. 09/293,594. Furthermore, other types of data services may be provided.

Personal Proxy Server

As illustrated in FIGS. 2A and 2B, two different data services (the Internet 201 and a data broadcast service) may be provided to a single client computer system. In other embodiments (not shown) more than two different data services may be coupled to a single client computer system. Each different data service may provide different types of information and different sources of information. One method of allowing a user of the client computer system to access the different data services would be to have a different client program on the client computer system for each different data service. In such an embodiment, each client program could have special features that address specific characteristics of each data service. However, such an embodiment would require the user to learn a different user interface for each type of data service. Furthermore, the user would have to maintain all the different client programs for each data service. Thus, it would be desirable to have a unified system of accessing different data services.

Figure 4:
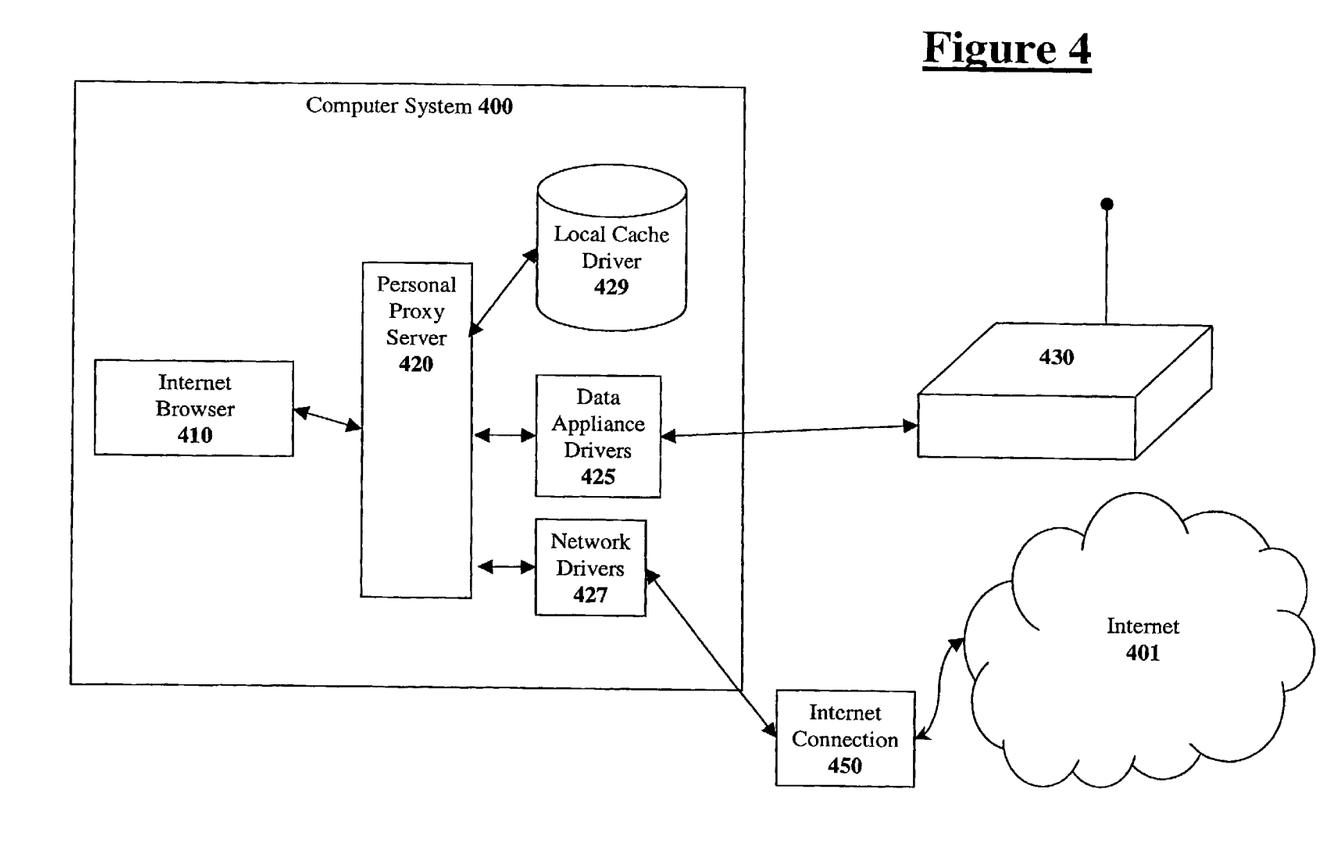
FIG. 4 illustrates a block diagram of a personal computer system that uses a single browser system to communicate with several data sources using a personal proxy server.

The present invention introduces a method of allowing a common Internet browser program be used to access multiple different data services. Specifically, the present invention introduces a "personal proxy server." The personal proxy server responds to requests from an Internet browser and then handles those requests using an appropriated data service. FIG. 4 illustrates a first embodiment of a personal proxy server 420.

Referring to FIG. 4, an Internet browser 410 runs on a computer system 400. The Internet browser 410 may be Netscape's Navigator, Microsoft's Internet Explorer, or any other suitable Internet browser program. The Internet browser 410 is configured to access the Internet using a proxy server wherein the proxy server is specified as the personal proxy server 420. The personal proxy server 420 is actually a program that runs on the computer system 400. In such a configuration, the Internet browser 410 will communicate with the personal proxy server 420 whenever the Internet browser 410 has a data request. The personal proxy server 420 is thus responsible for properly handling all communication from the Internet browser 410.

In the embodiment of FIG. 4, the personal proxy server 420 has access to two different data services. Specifically, the personal proxy server 420 may access the Internet 401 using network drivers 427 through an Internet connection 450 or the personal proxy server 420 may access a data broadcast service through data appliance drivers 425 that communicate with a data broadcast receiver system 430. When the personal proxy server 420 receives a request from the Internet browser 410 the personal proxy server 420 must first decide which data service will respond to the request. The personal proxy server 420 then consults with the selected data service to handle the request. One method of determine which data service to use is to examine the Uniform Resource Locator (URL) of the request for specific patterns. For example, the personal proxy server 420 may direct all URLs containing the Internet domain name "AcmeDataBroadcast.com" toward the data broadcast receiver system 430.

Once the personal proxy server 420 has determined which data service to handle a particular request, the personal proxy server 420 may simply relay the request on to the proper data service. For example, if the personal proxy server 420 receives an HTTP "GET" request for an Internet site, the personal proxy server 420 may simply pass the HTTP "Get" request to the Internet service using the Internet connection.

It should be emphasized that the personal proxy server 420 can handle many different data services. Furthermore, other types of data systems may be provided. For example, FIG. 4 further includes a local cache driver 429 that may be used to handle certain requests.

Integration with Existing Proxy Servers

As previously set forth with references to FIGS. 1A, 1B, and 1C, there are many different ways to connect a computer system to the global Internet. As illustrated in FIG. 1A, many computers are coupled directly to the Internet. However, computers are increasingly coupled to the Internet using an indirect connection as shown FIGS. 1B and 1C. To adequately hand consumer expectations, the personal proxy server must be able to handle many different types of Internet connections.

Direct Internet, Packet Filtering Routers, or Simple Proxy Firewall Connections

Figure 5:
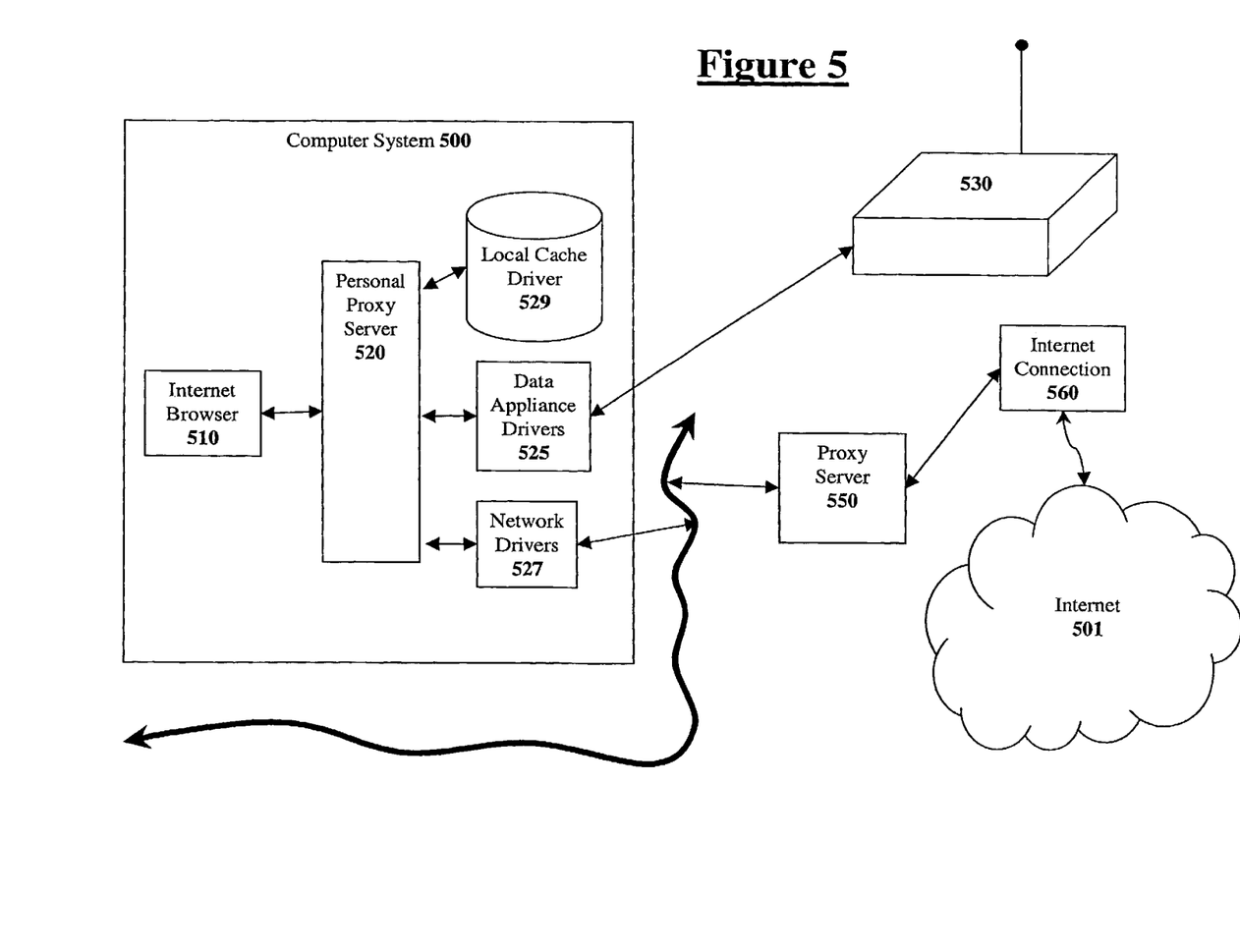
FIG. 5 illustrates a block diagram of a personal computer system that uses a personal proxy server to communicate with the Internet through a proxying firewall.

FIG. 5 illustrates a computer system 500 that uses a personal proxy server 520 to service an Internet browser

510. The personal proxy server 520 must direct requests from the Internet browser 510 to a local cache 529, a data broadcast service on data broadcast receiver 530, or the global Internet 501 via a proxy server 550. Since the Internet 501 is only accessible via the proxy server 550, the personal proxy server 520 must use the proxy server 550 appropriately.

Figure 6:
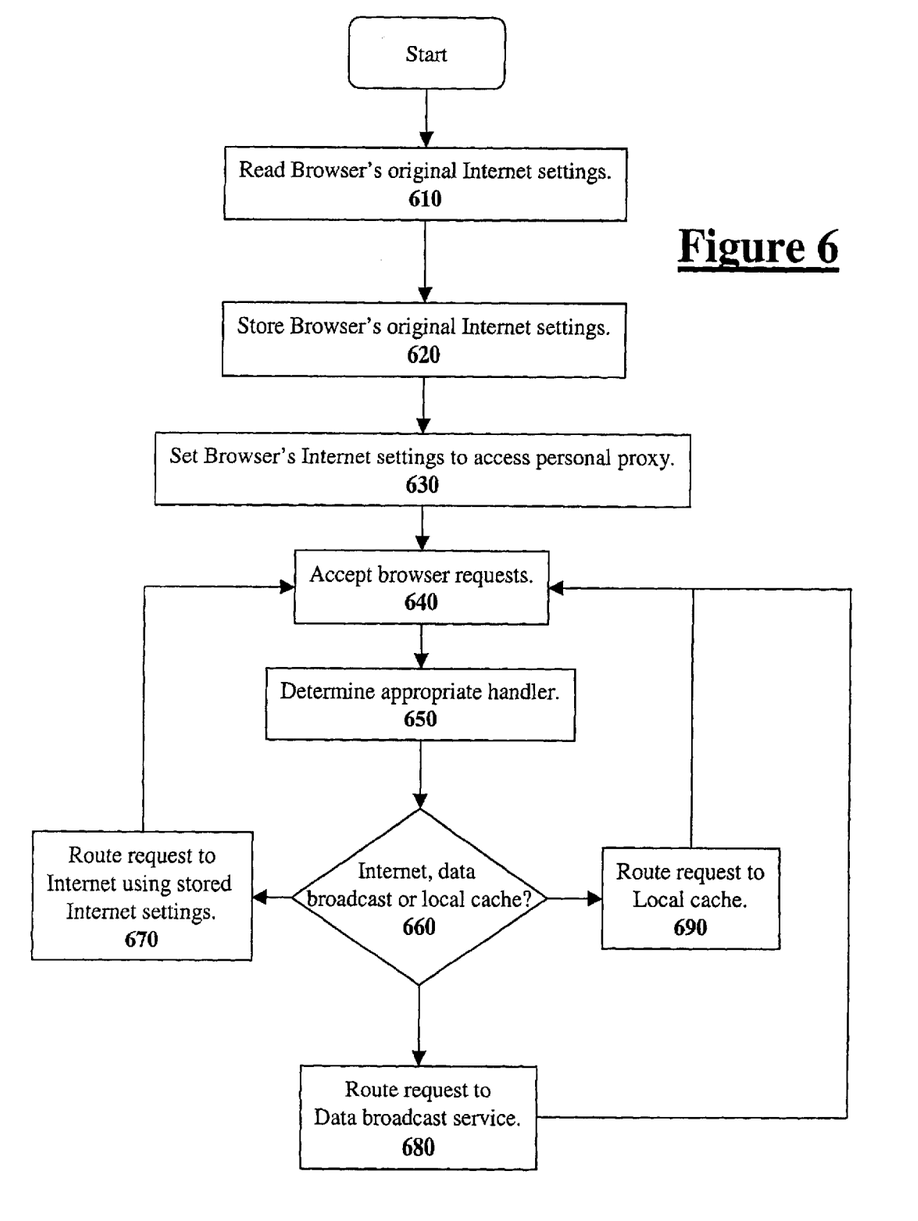
FIG. 6 illustrates a flow diagram that describes the operation of a personal proxy server.

FIG. 6 illustrates a flow diagram that describes how the personal proxy server 520 may operate in an environment with a direct Internet connection, a packet filtering firewall, or the simple proxying firewall as illustrated in FIG. 5. Referring to step 610, the personal proxy server 520 first reads the original Internet settings of the Internet browser 510. Next, the personal proxy server 520 stores the original Internet settings at step 620. The personal proxy server 520 stores the setting so that (1) the personal proxy server 520 will know how to access the Internet; and (2) the personal proxy server 520 will be able to replace the original Internet settings if the personal proxy server 520 is uninstalled.

At step 630, the personal proxy server 520 changes the Internet settings of the Internet browser 510 such that the Internet browser 510 will access the personal proxy server 520 for future requests. Specifically, the personal proxy server 520 instructs the Internet browser 510 to access the personal proxy server 520 as proxy server for all future requests of designated types. In one embodiment, the personal proxy server 520 only handles HyperText Transport Protocol (HTTP) requests.

After setting the Internet browser's settings, the personal proxy server 520 is ready to accept requests at step 640. When the personal proxy server 520 receives a request, the personal proxy server 520 determines the appropriated handler to handle the request at step 650. As previously set forth, the personal proxy server 520 may determine the proper handler by examining the URL in the request. After determining the proper handler, the personal proxy server 520 directs the request to the proper handler at step 660.

If the appropriate handler is the local cache or data broadcast service, then the personal proxy server 520 proceeds to steps 690 or 680, respectively, to handle the request. If the Internet should handle the received request, then the personal proxy server 520 proceeds to step 670 where it uses the stored Internet settings. If the stored Internet settings indicate a direct connection, then the request is relayed onto the Internet. If the stored Internet settings indicate a proxy server connection, then the personal proxy server 520 communicates with the Internet through the specified proxy connection. In such an environment, there is a double layer proxy.

AutoConfig Proxy Firewall Connections

Certain firewalls implement a sophisticated proxying system known as an autoconfig proxy. An autoconfig proxy system uses a file that automatically configures the client system. In an environment that uses an autoconfig proxy, each client system is formed where the autoconfig file may be found. Each client fetches that autoconfig file and uses that autoconfig file to determine how browser requests should be handled. In many embodiments, the autoconfig file contains a short JavaScript program that contains function FindProxyForURL( ) that returns an access method for a particular protocol.

Figure 7:
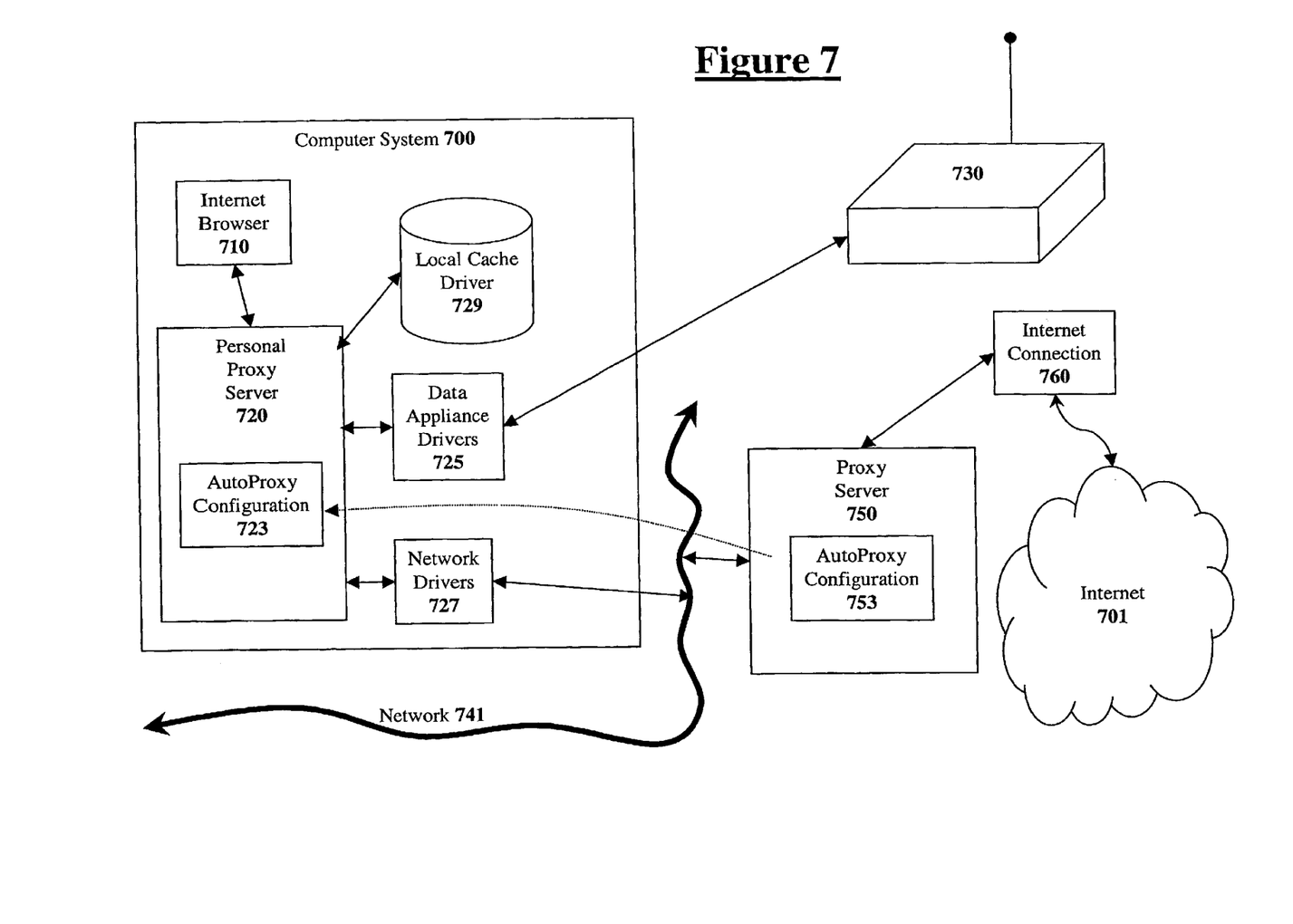
FIG. 7 illustrates a block diagram of a personal computer system that uses a personal proxy server to communicate with the Internet through a proxying firewall that uses an autoconfig file.

FIG. 7 illustrates an example of a network environment with an autoconfig proxy server system. Referring to FIG. 7, a proxy server 750 connects a network 741 to the Internet 701. The proxy server 750 has an autoconfig file 753 that specifies how to use the proxy server 750. (Note that the autoconfig filed 753 does not need to be stored on the proxy server 750 but it must be accessible by all the clients on the network 741.) Each client system on the network 741, such as computer system 700, must fetch the autoconfig file 753 in order to learn how to access the Internet 701 via the proxy server 750.

Figure 8:
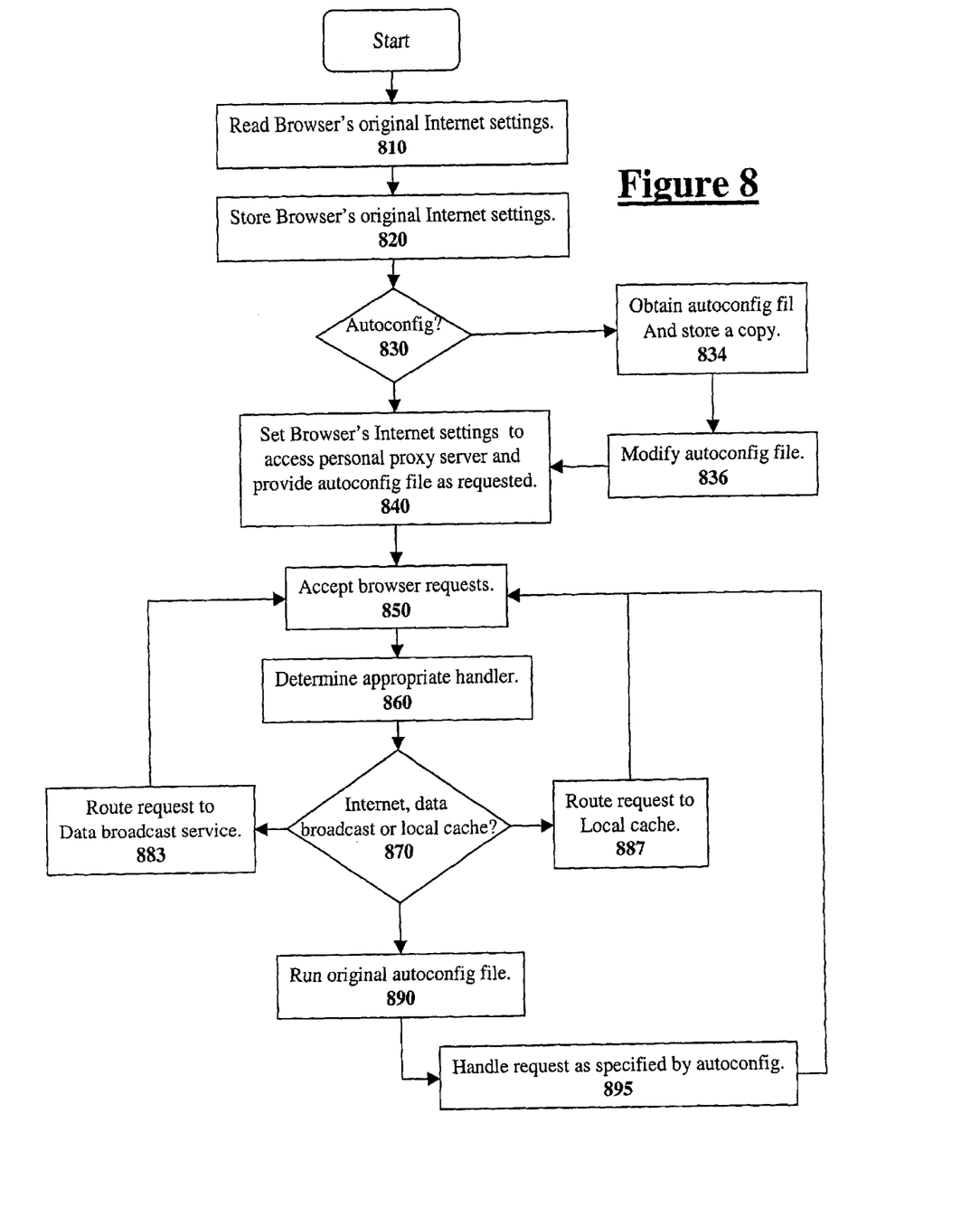
FIG. 8 illustrates a flow diagram that describes the operation of a personal proxy server that communicates with a proxying firewall that uses an autoconfig file.

FIG. 8 illustrates how a personal proxy server 720 implemented according to the teachings of the present invention operates in an autoconfig proxy environment. Referring to step 810, the personal proxy server 720 first reads the original Internet settings of the Internet browser 710. Next, the personal proxy server 720 stores the original Internet settings at step 820. At step 830, the personal proxy server 720 determines if the Internet settings specify an autoconfig proxy. If the settings specify an autoconfig proxy, then personal proxy server 720 proceeds to step 834 where it obtains the autoconfig file and stores a copy of that original autoconfig file. Next, at step 836, the personal proxy server 720 modifies the autoconfig file. Specifically, the personal proxy server alters the autoconfig file such that the personal proxy server 720 will be accessed if an HTTP request is made.

To fully describe how the personal proxy server 720 modifies an autoconfig rile, an example will be provided. A sample autoconfig file may contain the following JavaScript code:

```
/*
 * HTTP traffic uses proxy1, FFP traffic uses proxy2
 * All other protocols directly connect.
 */
function FindProxyForURL(url, hostname)
{
    if (shExpMatch(url, "http:*")) {
        return "PROXY proxy1:1234";
    } else if (shExpMatch(url, "ftp:*")) {
    return "PROXY proxy2:1235";
    }
    return "DIRECT";
}
```

The personal proxy server 720 modifies an autoconfig file by renaming an original "FindProxyForURL" procedure and replacing it with a revised FindProxyForURL that directs http requests to the personal proxy server 720 that monitors TCP port 1166. The modified autoconfig file is shown below:

```
/*
 * HTTP traffic uses proxy1, FTP traffic uses proxy2
 * All other protocols directly connect.
 */
function FindProxyForGeo(url, hostname)
{
    if (shExpMatch(url, "http:*"))
        return "PROXY proxy1:1234";
    } else if (shExpMatch(url, "ftp:*")) {
    return "PROXY proxy2:1235";
    }
    return "DIRECT";
}
/* Geocast added body */
function FindProxyForURL(url, host)
{
    res = FindProxyForGeo(url, host);
    if (shExpMatch(url, "http:*")) {
        return "PROXY localhost:1166;" + res;
        /* Person Proxy Program responds to requests at port 1166 */
    }
    return res;
}
```

After modifying the autoconfig file (if there was one), the personal proxy server 720 sets the Internet browsers settings to access the personal proxy server 720. If the original settings specified an autoconfig file, then the personal proxy server 720 specifies that the Internet browser 710 should access the personal proxy server 720 to obtain an autoconfig file. When the Internet browser subsequently requests the autoconfig file, the personal proxy server 720 supplies the modified autoconfig file. The Internet browser 710 will use the supplied autoconfig file to determine how requests should be handled. Certain requests will be directed to the personal proxy server 720.

After setting the Internet browser's settings, the personal proxy server 720 is ready to accept requests at step 850. When the personal proxy server 720 receives a request, the personal proxy server 720 determines the appropriated handler to handle the request at step 860. As previously set forth, the personal proxy server 720 may determine the proper handler by examining the URL in the request. After determining the proper handler, the personal proxy server 720 directs the request to the proper handler at step 870. If the appropriate handler is the local cache or data broadcast service, then the personal proxy server 720 proceeds to steps 887 or 883, respectively, to handle the request.

If the Internet should handle the received request, then the personal proxy server 720 proceeds to step 890 where the personal proxy server 720 runs the original autoconfig file. The personal proxy server 720 then uses the results from that original autoconfig file to handle the requests as specified in step 895.

The foregoing has described a multiple source proxy management system. It is contemplated that changes and modifications may be made by one of ordinary skill in the art, to the materials and arrangements of elements of the present invention without departing from the scope of the invention.

What is claimed is:

1. A method for handling browser requests for more than one data service with a personal proxy program, said method comprising:

accessing a browser's original Internet connection settings;

storing said browser's original Internet connection settings;

updating the Internet connection settings of said browser to access said personal proxy program;

interfacing said personal proxy program with at least two different types of handlers including a broadcast media handler and an Internet handler;

accepting in said personal proxy program a request from said browser;

selecting one of the handlers to handle said request;

directing said request to said handler; and receiving multimedia content from said handler for display in said browser.

2. The method of claim 1 wherein directing said request to said handler comprises directing said request to the Internet using said stored Internet connection settings if said Internet should handle said request.

3. The method of claim 1 wherein directing said request to said handler comprises directing said request to a second program running on a computer system that is running said personal proxy program.

4. The method of claim 3 wherein said second program comprises a local cache server if said local cache server should handle said request.

5. The method of claim 1 wherein directing said request to said handler comprises directing said request to a broadcast media receiver.

6. The method of claim 1 wherein said multimedia content is one of a terrestrial radio broadcast, a satellite television broadcast, and a cable television broadcast.

7. An apparatus for browsing data from more than one data service, comprising:

a browser program for browsing accessible data resources using data resource requests;

a first request handler for handling data resource requests;

a second request handler for handling broadcast media requests;

a personal proxy program, said personal proxy program accessing a browser's original Internet connection settings, storing said browser's original Internet connection settings, updating the Internet connection settings of said browser to access said personal proxy program, accepting a request from said Internet browser, selecting one of said request handlers to handle said request, and directing said request to a selected request handler.

8. The apparatus of claim 7 wherein said first request handler comprises the Internet.

9. The apparatus of claim 7 wherein said first request handler comprises directing said request to a second program running on a computer system that is running said personal proxy program.

10. The apparatus of claim 7 wherein said first request handler comprises a local cache server.

11. The apparatus of claim 7 wherein said second request handler comprises a broadcast media receiver.

12. The apparatus of claim 11 wherein said broadcast media receiver is to receive one of a terrestrial radio broadcast, a satellite television broadcast, and a cable television broadcast.

13. A method for handling browser requests from a browser program for more than one data service with a personal proxy program, said method comprising:

accessing an original browser autoconfig file used by said browser program;

creating a modified autoconfig file from said original browser autoconfig file;

instructing said browser program to access said modified autoconfig file;

interfacing said personal proxy program with at least two different handlers including a broadcast media handler and an Internet handler;

accepting in said personal proxy program a request from said browser program;

selecting a handler to handle said request; and, directing said request to said handler.

14. The method of claim 13 wherein directing said modified autoconfig file directs requests to said personal proxy program.

* * * * *